United States Patent
Bornschlegel (12)

(10) Patent No.: US 10,456,848 B1
(45) Date of Patent: Oct. 29, 2019

(54) RECIPROCATING SAW BLADE ASSEMBLY

(71) Applicant: Lee Bornschlegel, Prescott, AZ (US)

(72) Inventor: Lee Bornschlegel, Prescott, AZ (US)

(*) Notice: Subject to any disclaimer, the term of this patent is extended or adjusted under 35 U.S.C. 154(b) by 92 days.

(21) Appl. No.: 14/735,420

(22) Filed: Jun. 10, 2015

Related U.S. Application Data

(60) Provisional application No. 62/058,139, filed on Oct. 1, 2014.

(51) Int. Cl.
*B23D 61/12* (2006.01)

(52) U.S. Cl.
CPC ........ *B23D 61/125* (2013.01); *B23D 61/122* (2013.01); *B23D 61/128* (2013.01)

(58) Field of Classification Search
CPC .. B23D 61/125; B23D 61/122; B23D 61/123; B23D 61/128; B23D 49/11; B27G 13/14; Y10T 83/9319
See application file for complete search history.

(56) References Cited

U.S. PATENT DOCUMENTS

| | | | | |
|---|---|---|---|---|
| 1,205,871 A | * | 11/1916 | Dwyer | B26B 3/04 30/304 |
| 1,497,577 A | * | 6/1924 | Morzsa | B23D 49/11 125/15 |
| 4,979,305 A | | 12/1990 | Leini | |
| 5,456,010 A | * | 10/1995 | Bryda | B26B 3/04 30/286 |
| 5,473,820 A | | 12/1995 | Werner et al. | |
| 6,007,541 A | | 12/1999 | Scott | |
| 8,021,364 B2 | | 9/2011 | Nolde | |
| 8,685,028 B2 | | 4/2014 | Chong | |
| 2008/0276470 A1 | | 11/2008 | Ritter et al. | |
| 2011/0047952 A1 | | 3/2011 | Matsu et al. | |
| 2013/0032016 A1 | | 2/2013 | Butzen et al. | |

FOREIGN PATENT DOCUMENTS

FR 560035 A * 9/1923 ........... B23D 49/006

* cited by examiner

*Primary Examiner* — Kenneth E Peterson
*Assistant Examiner* — Liang Dong
(74) *Attorney, Agent, or Firm* — Booth Udall Fuller, PLC

(57) ABSTRACT

A reciprocating saw blade assembly that includes a drive blade and one or more side blades positionally coupled to the drive blade is disclosed. The drive blade may include a tang on a first end of the drive blade configured to removably couple to a reciprocating saw tool. A cutting edge may extend at least partially between the first end and a second end. The one or more side blades each may include a first end proximate and offset from the first end of the drive blade such that the tang of the drive blade is exposed, and a cutting edge that is at least partially between the first end and the second end of each side blade. The drive blade and the one or more side blades may be positionally coupled with at least two rivets extending through the drive blade and the one or more side blades.

5 Claims, 4 Drawing Sheets

US 10,456,848 B1

RECIPROCATING SAW BLADE ASSEMBLY

CROSS REFERENCE TO RELATED APPLICATIONS

This document claims the benefit of the filing date of U.S. Provisional Patent Application 62/058,139, entitled "Rato Blade" to Bornschlegel which was filed on Oct. 1, 2014, the contents of which are hereby incorporated by reference.

BACKGROUND

1. Technical Field

Aspects of this document relate generally to reciprocating saws.

2. Background Art

Rasps are tools conventionally used when a wood or metalworker desires to create a notch or series of notches in wood or metal. Rasps, however, are manual tools that can be difficult to operate over prolonged periods and very labor intensive. Power rasps are often relatively expensive and more difficult to use. Furthermore, power rasps clog easily with removed material and must be constantly cleaned.

SUMMARY

Aspects of this document relate generally to reciprocating saw blade assemblies that reduce fatigue of the user, remove unwanted materials in short time without clogging, and allow for accuracy in the hands of the skilled worker.

Particular implementations of reciprocating saw blade assemblies may include one or more of the following.

A reciprocating saw blade assembly may include a drive blade comprising a tang on a first end of the drive blade configured to removably couple to a reciprocating saw tool, a second end opposite the first end, and a cutting edge comprising a plurality of teeth and extending at least partially between the first end and the second end. One or more side blades may be positionally coupled to the drive blade and each comprising a first end proximate and offset from the first end of the drive blade such that the tang of the drive blade is exposed, a second end opposite the first end, and a cutting edge comprising a plurality of teeth and extending at least partially between the first end of the respective one or more side blades and the second end of the respective one or more side blades.

The one or more side blades may include a plurality of side blades, at least one of the plurality of side blades being positionally coupled to a first side of the drive blade and at least one of the plurality of side blades being positionally coupled to a second side of the drive blade opposite the first side of the drive blade.

The drive blade may be coupled to the plurality of side blades with at least two rivets, each of the at least two rivets extending through the drive blade and the plurality of side blades.

The cutting edges of the drive blade and the plurality of side blades may be aligned along a common plane.

Cutting edges of the drive blade and the plurality of side blades may form a V-shaped configuration or a U-shaped configuration.

The at least two rivets may include at least three rivets comprising a rear rivet proximate the first ends of the drive blade and the plurality of side blades, a central rivet substantially central between the first ends of the drive blade and the plurality of side blades, and a front rivet proximate the second ends of the drive blade and the plurality of side blades, wherein the front rivet is configured to pinch the second ends of the drive blade and the plurality of side blades closer to each other than the rear rivet and central rivet.

A plurality of spacers may be positioned between adjacent blades of the drive blade and the plurality of side blades, wherein each of the plurality of spacers may be coupled to one of the at least two rivets.

The drive blade and the plurality of side blades may be in direct contact with adjacent blades of the drive blade and the plurality of side blades.

First ends and second ends of the plurality of side blades may be aligned and the drive blade may overlap with a majority of the adjacent side blades of the plurality of sides blades.

Another reciprocating saw blade assembly may include a drive blade comprising a tang on a first end of the drive blade configured to removably couple to a reciprocating saw tool, and a second end opposite the first end. A plurality of side blades may be positionally coupled to the drive blade and each comprising a first end proximate and offset from the first end of the drive blade such that the tang of the drive blade is exposed, a second end opposite the first end, and a cutting edge comprising a plurality of teeth and extending at least partially between the first end of the respective one or more side blades and the second end of the respective one or more side blades.

At least one of the plurality of side blades may be positionally coupled to a first side of the drive blade and at least one of the plurality of side blades being positionally coupled to a second side of the drive blade opposite the first side of the drive blade.

The drive blade may be coupled to the plurality of side blades with at least two rivets, each of the at least two rivets extending through the drive blade and the plurality of side blades.

Cutting edges of the plurality of side blades may form a V-shaped configuration or a U-shaped configuration.

A plurality of spacers may be positioned between adjacent blades of the drive blade and the plurality of side blades, wherein each of the plurality of spacers are coupled to one of the at least two rivets.

The drive blade and the plurality of side blades may be in direct contact with adjacent blades of the drive blade and the plurality of side blades.

First ends and second ends of the plurality of side blades my be aligned and the drive blade may overlap with a majority of the adjacent side blades of the plurality of sides blades.

Still another reciprocating saw blade assembly may include a drive blade comprising a tang on a first end of the drive blade configured to removably couple to a reciprocating saw tool, a second end opposite the first end, and a cutting edge comprising a plurality of teeth and extending at least partially between the first end and the second end. A plurality of side blades may be positionally coupled to the drive blade and each comprising a first end proximate and offset from the first end of the drive blade, a second end opposite the first end, and a cutting edge comprising a plurality of teeth and extending at least partially between the first end of the respective one or more side blades and the second end of the respective one or more side blades, wherein the cutting edge of the drive blade overlaps with a majority of the cutting edge of each of the plurality of side blades.

The drive blade may be coupled to the plurality of side blades with at least three couplings comprising a rear couplings proximate the first ends of the drive blade and the plurality of side blades, a central couplings substantially central between the first ends of the drive blade and the plurality of side blades, and a front couplings proximate the second ends of the drive blade and the plurality of side blades, wherein the front couplings is configured to pinch the second ends of the plurality of side blades closer to each other than the rear rivet and central rivet.

A plurality of spacers may be included and positioned between adjacent blades of the drive blade and the plurality of side blades, wherein each of the plurality of spacers are coupled to one of the rear coupling and the central coupling, and wherein the front coupling pinches the second ends of the side blades together until the second ends of the side blades contact one another.

Cutting edges of the plurality of side blades and the drive blade may form a V-shaped configuration or a U-shaped configuration.

Aspects and applications of the disclosure are described below with reference to the DRAWINGS and the DETAILED DESCRIPTION. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographer, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended reciprocating saw blade assembly and/or assembly procedures for a reciprocating saw blade assembly will become apparent for use with implementations of reciprocating saw blade assemblies from this disclosure. Accordingly, for example, although particular tools and blades are disclosed, such reciprocating saw tools and blades and implementing components may comprise any shape, size, style, type, model, version, measurement, concentration, material, quantity, and/or the like as is known in the art for such reciprocating saw blade assembly and implementing components, consistent with the intended operation of a reciprocating saw.

Figure 5:
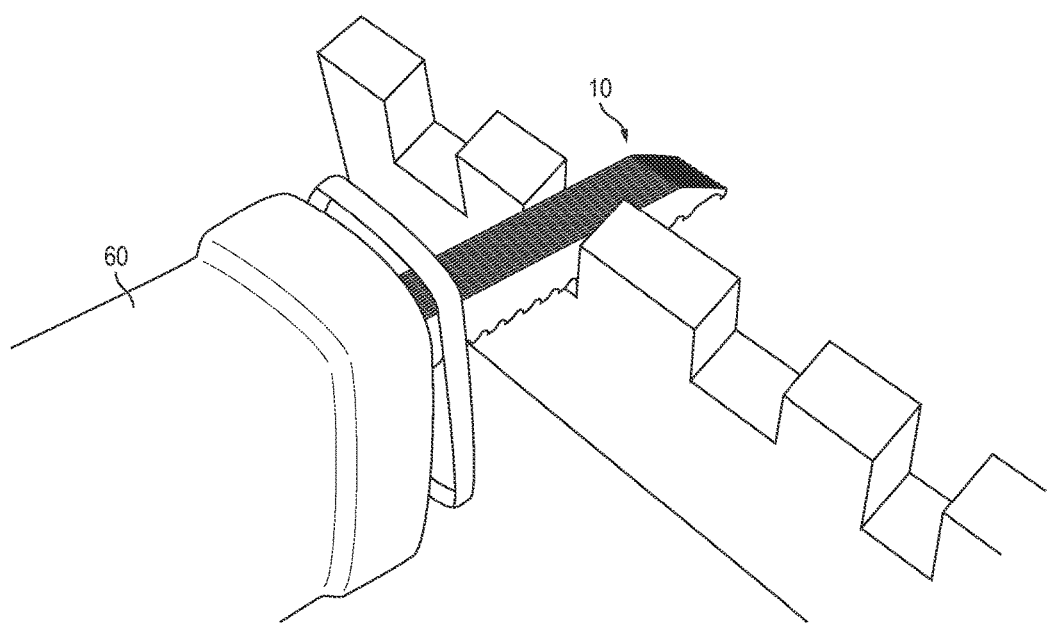
FIG. 5 is a perspective view of a first embodiment of a reciprocating saw blade assembly operably coupled to a reciprocating saw tool.

Various embodiments of the present disclosure comprise a reciprocating saw blade assembly that may function as a rasp. As shall be described in greater detail below, one or more embodiments comprise a plurality of saw blades positionally coupled together. One blade is configured to removably or otherwise operably couple to a powered reciprocating saw tool. In operation, a saw blade assembly operably coupled to a power reciprocating saw tool can cut notches in various materials in a short amount of time. The notch created in the material may be sized to the overall width of the reciprocating saw blade assembly. FIG. 5 depicts a conventional power reciprocating saw tool 60 cutting notches into wood with a non-limiting embodiment of a reciprocating saw blade assembly 10. The notches formed in the material, such as wood or metal, are formed in a fraction of the time it would ordinarily take to make such a notch with a grinder wheel or single cutting blade.

Figure 1:
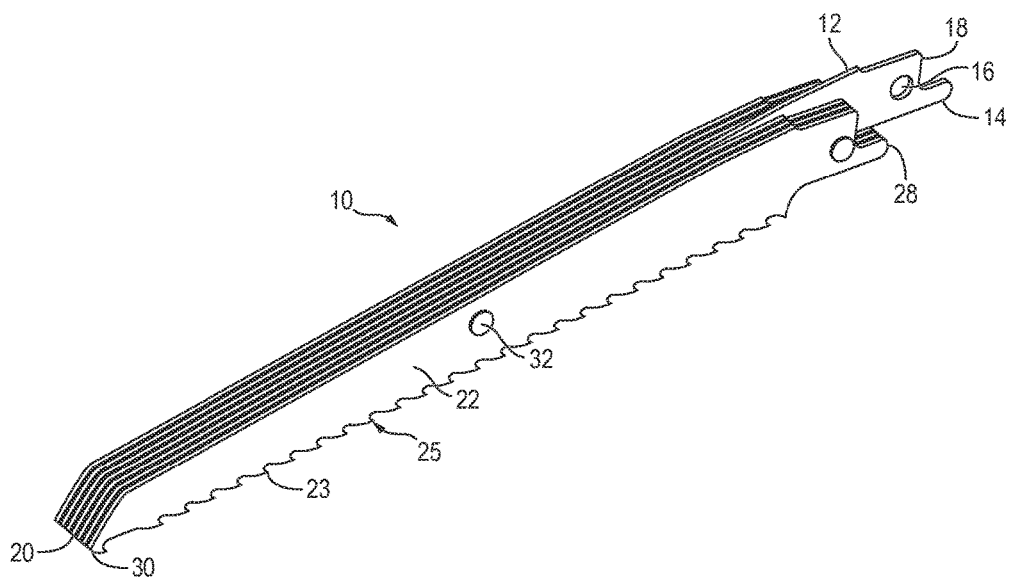
FIG. 1 is a perspective view of a first embodiment of a reciprocating saw blade assembly.

FIG. 1 depicts a non-limiting embodiment of a reciprocating saw blade assembly 10. According to some aspects, a saw blade assembly 10 comprises a drive blade 12 and one or more side blades 22 coupled to the drive blade 12. A drive blade 12 comprises a tang 4 or any other coupling feature of a reciprocating saw blade configured to removably coupled a reciprocating saw blade to a reciprocating saw tool 60 on a first end 18 of the drive blade. A tang 14 may include a tool coupling hole 16 proximate a first end 18 of the drive blade 12 for removable coupling of the drive blade 12 to a reciprocating saw tool 60. In one or more embodiments, a tang 14 of the drive blade 12 is offset or extends beyond first ends 28 of the side blades 22 sufficient to allow coupling of the drive blade 12 to a reciprocating saw tool 60 and operation of the reciprocating saw blade assembly 10 after coupling of the drive blade 12 to the reciprocating saw tool 60.

One or more embodiments of a drive blade 12 comprise a cutting edge 15 (shown in FIG. 4) extending at least partially between a first end 18 and a second end 20 of the drive blade 12. The cutting edge 15 is typically on a bottom edge of the drive blade 12 and comprises a plurality of teeth 23. The plurality of teeth 23 of the cutting edge 15 may comprise any tooth configuration, size, spacing, and the like of reciprocating saw blades known in the art. In other embodiments, a drive blade 12 may be void of teeth and recess from the plurality of side blades 22.

Similarly, one or more embodiments of a side blade 22 comprise a cutting edge 25 extending at least partially between a first end 28 and a second end 30 of the side blade 22. The cutting edge 25 is typically on a bottom edge of the drive blade 22 and comprises a plurality of teeth 23. The plurality of teeth 23 of the cutting edge 25 may comprise any tooth configuration, size, spacing, and the like of reciprocating saw blades known in the art.

In the non-limiting embodiment depicted in FIG. 1, the reciprocating saw blade assembly 10 comprises a plurality of side blades 22 coupled to the drive blade 22. More particularly, one or more embodiments of a reciprocating saw blade assembly 10 may comprise a plurality of side blades 22 positioned on a first side of the drive blade 12, and a plurality of side blades 22 positioned on a second side of the drive blade 12 opposite the first side of the drive blade 12. Even more particularly, a reciprocating saw blade assembly 10 may comprise a drive blade 12 and three or more side blades 22 positioned on either side of the drive blade 12. When coupled together, a second end 20 of the drive end 12 may align with a second end of the side blades 22, as depicted in the non-limiting embodiment depicted in FIG. 1, or may be offset from the side blades, as depicted in the non-limiting embodiment depicted in FIG. 2. In any event, a majority of the drive blade 12 may overlap with adjacent side blades 22. More particularly, a majority of the cutting edge 15 of the drive blade 12 may overlaps with the cutting edges 25 of adjacent side blades 25.

In one or more embodiments of a reciprocating saw blade assembly 10, the drive blade 12 is positionally coupled to the one or more side blades 22. As used herein, positionally coupled means that the drive blade 12 and any side blades 22 positionally coupled thereto move together in unison, at the same rate, and in the same direction. Thus, because the drive blade 12 is positionally coupled to one or more side blades 22, any movement of the drive blade 12 effectuated by the reciprocating saw tool 60 results in the same movement by the one or more side blades 22 positionally coupled to the drive blade 12.

According to some aspects, a drive blade 12 is positionally coupled to one or more side blades 22 with at least one coupling. The at least one coupling may comprise a rivet 32, a pin, a screw, a bolt and nut, and the like. The one or more couplings may be positioned at a rear portion, a central portion, and/or a front portion.

In the non-limiting embodiment depicted in FIG. 1, the drive blade 12 is positionally coupled to one or more side blades 22 with two rivets 32: a front rivet and central rivet. According to some aspects, a first or rear rivet 32 may extend through tool coupling holes of the side blades 22, as well as a newly formed hole in the drive blade aligned with the tool coupling holes of the side blades 22. In other embodiments, a first or front rivet 32 extends through a first hole 26 aligned in each of the one or more side blades 22 and the drive blade 12. Similarly, a second or central rivet 32 extends through a second hole 27 aligned in each of the one or more side blades 22 and the drive blade 12.

Figure 4:
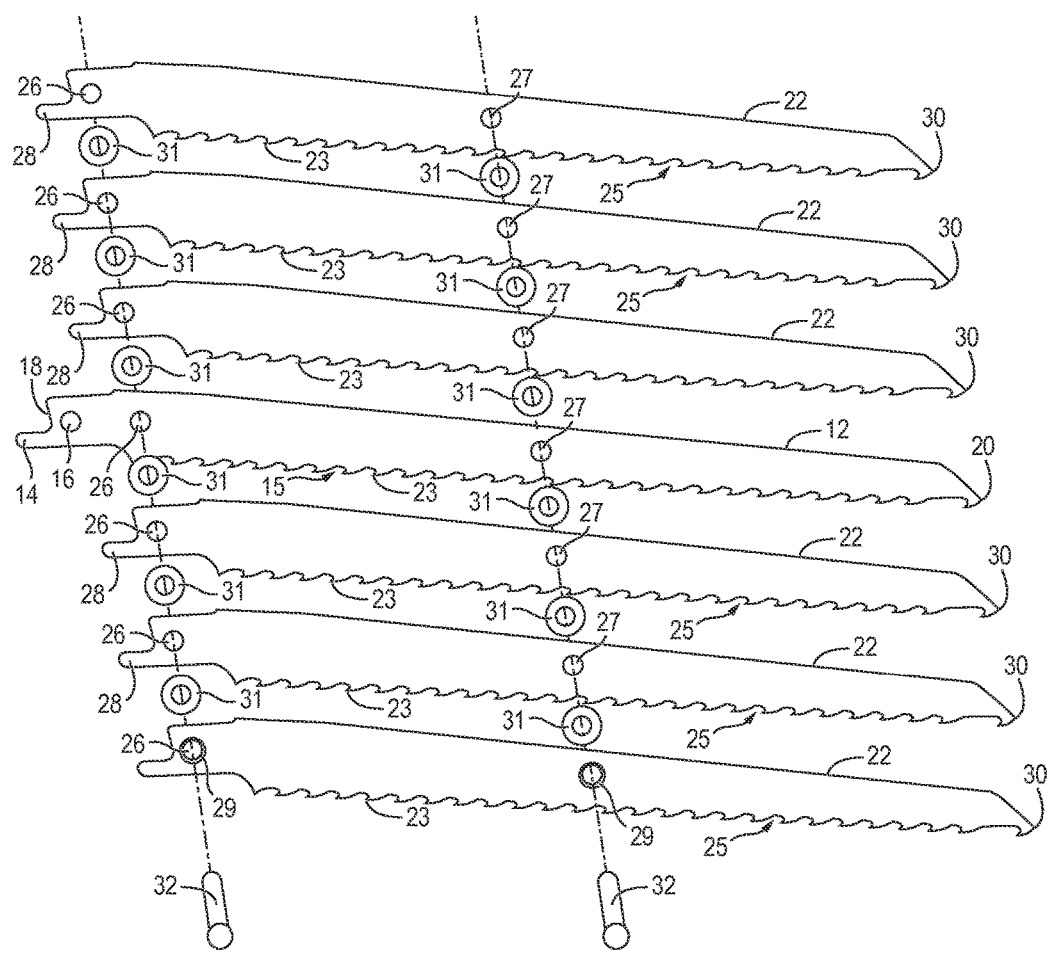
FIG. 4 is an exploded view of a first embodiment of a reciprocating saw blade assembly.

FIG. 4 depicts and exploded view of a reciprocating saw blade assembly 10. In some non-limiting embodiments, the aligned first holes 26 are proximate a first end 16, 26 of the drive blade 12 and side blades 22, and the aligned second holes 27 are approximately central between the first end 16, 26 and the second end 20, 30 of the drive blade 12 and the side blades 22. In other embodiments, the aligned first holes 26 and second holes 27 may be positioned at other suitable locations on the drive blade 12 and side blades 22.

According to some aspects, an outer most side blade 22 or drive blade 12 may comprise a counter sink 29 around each first hole 26 and second hole 27. The counter sink 29 is sized to receive a head of the rivet 32 such that the top of the head of the rivet 32 is flush with the outer surface of the outermost side blade 22 or drive blade 12.

Figure 6A:
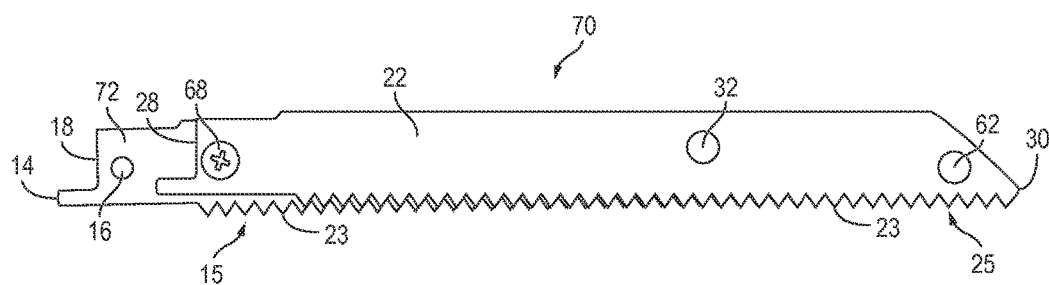
FIG. 6A is a side view of a fourth embodiment of a reciprocating saw blade assembly.
Figure 6B:
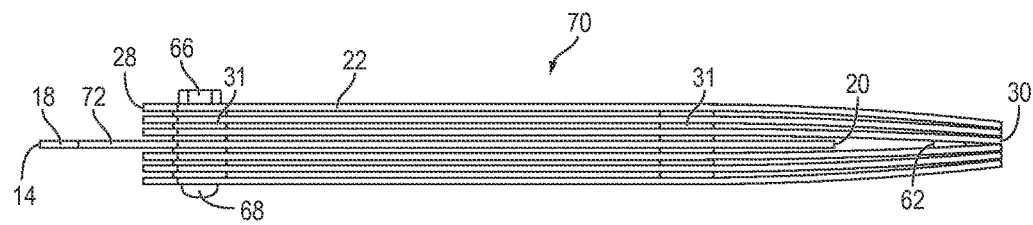
FIG. 6B is a top view of a fourth embodiment of a reciprocating saw blade assembly.

In one or more embodiments of a reciprocating saw blade assembly, an additional front rivet may be positioned proximate front or second ends of the drive blade and/or side blades. FIGS. 6A and 6B depict side and top views of a non-limiting embodiment of a reciprocating saw blade assembly 70 comprising a third or front rivet 62.

According to some aspects, a front rivet 62 may be shorter than the other rivets, pins, screws, bolts, and like, or otherwise configured to pinch the front second ends for the drive blade 72 and/or side blades 22 closer together than the rear first ends 18, 28 of the drive blade 72 and/or side blades 22. A front rivet 62 increases the overall strength of the reciprocating saw blade assembly, as well as prevents impact damage of the outside side blades in the event that the tip of the saw blade assembly were to strike something hard during operation. Such a configuration also creates a more thorough and clean notch in the cutting material.

In the non-limiting embodiment depicted in FIGS. 6A and 6B, the drive blade 72 is recessed from the side blades 22 such that the second end 20 of the drive blade 72 is offset inward from the second ends 30 of the side blades 22. In this configuration, a front rivet 62 extends through only the side blades 22, and does not extend through the drive blade 22 due to the offset inward recess of the drive blade 72. In the absence of the drive blade 72, the front rivet 62 pinches the plurality of the side blades 22 together the close the gap left by the drive blade 72, as well as any gaps between adjacent side blades 22. In other embodiments, a front rivet 62 may extend through the drive blade, while still pinching second ends 20, 30 of the drive blade and side blades 22 together.

Similar to other embodiments, the non-limiting embodiment of a reciprocating saw blade assembly in FIGS. 6A and 6B comprises a rear coupling and a central coupling configured to positionally couple the drive blade 72 to the side blades 22. In this and other embodiments, a rear coupling may comprise a nut 66 and bolt 68 used to positionally couple the drive blade 72 to the side blades 22. The bolt 68 extends through a first hole 26 of each of the drive blade 72 and the side blades 72, similar to the rivet 32 previously described. According to some aspects, spacers may be positioned between adjacent side blades 22 and/or drive blade. For the exemplary purposes of this disclosure, the spacers may be spacing washers 31, which are coupled to the bolt 68 and positioned between adjacent side blades 22 and/or drive blade. In other embodiments, a rivet 32 may be used in place of the nut 66 and bolt 68. Similarly, a nut 66 and bolt 68 may be used in other embodiments in place of a pin, rivet, and the like. Like other embodiments, a reciprocating saw blade assembly 70 may comprise spacers on one or more of the rivets 32, screws, nuts 68, pins, and the like.

Figure 2:
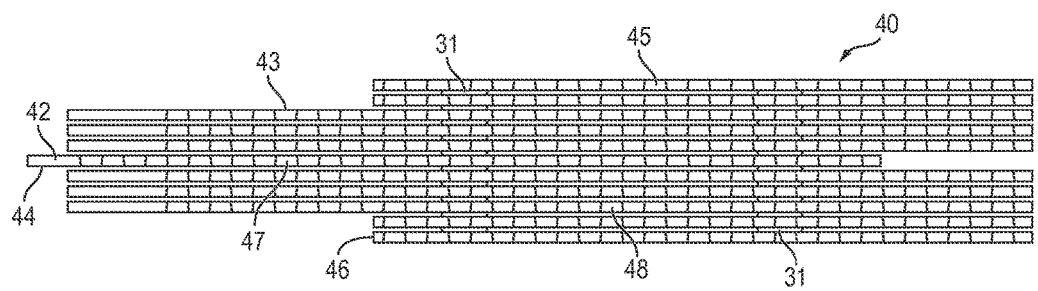
FIG. 2 is a bottom view of a second embodiment of a reciprocating saw blade assembly.

One or more embodiments of a saw blade assembly 10 may further comprise a plurality of spacers. For the exemplary purposes of this disclosure, the spacers may be washers 31 configured to space apart adjacent side blades 22 and/or drive blade 12 from one another. FIG. 2 depicts a bottom view of a saw blade assembly 40 that includes spacing washers 31, and FIG. 4 depicts an exploded view of a saw blade assembly 10 that includes spacing washers 31. Spacing washers 31 may comprise any of a variety of sizes of washers known in the art. According to some aspects, spacing washers 31 are positioned between each adjacent side blades 22 and/or drive blade 12. The spacing washers 31 may be held in place by one of the rivets 32, such that the rivet 32 extends through the spacing washer 31. In other embodiments, spacers or spacing washers may be placed anywhere on the side blades 22 and/or drive blade 12 in order to create a space between adjacent side blades and/or drive blade 12. It is contemplated that spacing may be utilized with any embodiment contemplated in this disclosure. This configuration may be advantageous for use in cutting wood material and for cleaning out the tool after use. Spacing also helps in that removed material is less likely to clog a saw blade assembly.

Figure 3:
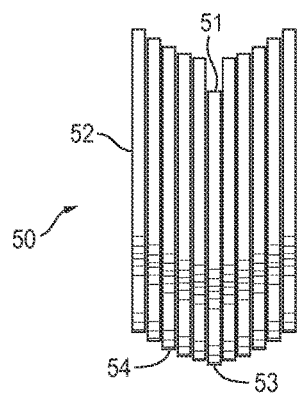
FIG. 3 is a front view of a third embodiment of a reciprocating saw blade assembly.

It is further contemplated that in some embodiments, the drive blade and the one or more side blades are positioned without spacers between adjacent blades such that adjacent sides of the drive blade and the one or more side blades are in direct contact with one another. FIG. 3 depicts a non-limiting embodiment of such a configuration. It is contemplated that such a configuration may be utilized with any other embodiments contemplated in this disclosure. This configuration may be advantageous for use in cutting metal.

According to some aspects, the cutting edges 15, 25 of the drive blade 12 and the one or more side blades 22 are aligned along a common plane. In more particularly embodiments the teeth 23 of the cutting edges 15, 25 of the drive blade 12 and the one or more side blades 22 may be aligned. The non-limiting embodiment of a saw blade assembly 10 depicted in FIG. 1 comprises teeth 23 of cutting edges 15, 25 aligned, with the cutting edges 15, 25 aligned along a common plane. In other embodiments, the drive blade and side blades may be positioned such that the cutting edges of the blades are positioned in in a non-planar configuration. For example, a non-limiting embodiment of a saw blade assembly depicted in FIG. 3 comprises a central drive blade 51 positionally coupled to a plurality of side blades 52 such that the cutting edge 53 of the drive blade 51 and the cutting edges 54 of the side blades 52 together form a convex- or V- or U-shaped configuration for the overall cutting edge. Such an overall cutting edge configuration allows for formation of a non-planar notch in the cutting material.

FIG. 2 depicts another non-limiting embodiment of a reciprocating saw blade assembly 40. According to some aspects, a saw blade assembly 40 may comprise a drive blade 42, one or more primary side blades 43, and one or more secondary side blades 46. The primary side blades 43 may comprise different dimensions than the secondary side blades 46. In the non-limiting embodiment depicted in FIG. 2. The reciprocating saw blade assembly 40 comprises three primary side blades 43 on both sides of the drive blade 42, and two secondary side blades 46 on both sides of the drive blade 42 but coupled to the outermost primary side blade 42. While the secondary side blades 46 are shorter than the primary side blades 43, the second ends of the primary side blades 43 and secondary side blades 46 are aligned. Similar to other embodiments, one or more rivets may be utility to positionally couple the blades of a reciprocating saw blad assembly 40. More particularly, in the non-limiting reciprocating saw assembly 40 depicted in FIG. 2, the saw blade assembly 40 comprises a first rivet extending through only the drive blade 42 and the primary side blades 43, and second and third rivets extending through all of the drive blade 42, the primary side blades 43, and the secondary side blades 46. As referenced above spacers, such as spacing washers for example, are coupled to the rivets and positioned between adjacent blades.

Also contemplated as part of this disclosure is a method of manufacturing a reciprocating saw blade assembly. According to some aspects, the first holes of the side blades are previously formed tool coupling holes, while the first hole of the drive blade is newly drilled to align with the previously formed tool coupling holes of the side blades. Thus, a method may comprise drilling a first hole in a drive blade to align with the tool coupling holes of the plurality of side blades.

In other embodiments, a method comprises drilling or otherwise creating a first hole in each of the drive blade and the plurality of side blades. A method may further comprise drilling or otherwise creating a second hole in each of the drive blade and the plurality of side blades. The second hole may be approximately central on the blade between the first end and the second end. More particular embodiments may comprise drilling or otherwise creating at least a third hole in each of the drive blades and the plurality of side blades.

A method of manufacturing a reciprocating saw blade assembly may further comprise aligning the first holes of the drive blade and the plurality of side blades, and inserting a pin, rivet, screw or other coupling device into the aligned first holes. Similarly, a method may further comprise aligning the at least second holes of the drive blade and the plurality of side blades, and inserting a pin, rivet, screw or other coupling device into the aligned at least second holes to positionally couple the drive blade and the plurality of side blades.

A method of manufacturing may further comprise position at least one washer between each adjacent blade such that the pin, rivet, or screw extends through the at least one washer.

A method of manufacturing may further comprise positioning the drive blade and the plurality of side blades such that the cutting edges of the blades are on a common plane before drilling the first holes and the second holes.

In other embodiments, a method of manufacturing may further comprise positioning the drive blade and the plurality of side blades such that the cutting edges of the blades form a V- or U-shaped configuration before drilling the first holes and/or the second holes.

It will be understood that implementations are not limited to the specific components disclosed herein, as virtually any components consistent with the intended operation of a method and/or system implementation for a reciprocating saw may be utilized. Accordingly, for example, although particular reciprocating saws and blades may be disclosed, such components may comprise any shape, size, style, type, model, version, class, grade, measurement, concentration, material, weight, quantity, and/or the like consistent with the intended operation of a method and/or system implementation for a reciprocating saw may be used.

In places where the description above refers to particular implementations of a reciprocating saw blade assembly, it should be readily apparent that a number of modifications may be made without departing from the spirit thereof and that these implementations may be applied to other reciprocating saws. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A reciprocating saw blade assembly, comprising:
   a drive blade comprising a tang on a first end of the drive blade configured to removably couple to a powered reciprocating saw tool, a second end opposite the first end, and a cutting edge comprising a plurality of teeth and extending at least partially between the first end and the second end; and
   a plurality of side blades positionally coupled to the drive blade and each comprising a first end proximate and offset from the first end of the drive blade such that the tang of the drive blade is exposed and protrudes longitudinally away from the plurality of side blades, a second end opposite the first end, and a cutting edge comprising a plurality of teeth and extending at least partially between the first end of the respective plurality of side blades and the second end of the respective plurality of side blades, wherein at least one of the plurality of side blades is positionally coupled to a first side of the drive blade and at least one of the plurality of side blades is positionally coupled to a second side of the drive blade opposite the first side of the drive blade, and wherein the drive blade is coupled to the plurality of side blades with at least two rivets, each of the at least two rivets extending through the drive blade and the plurality of side blades; and
   a plurality of spacers positioned between each pair of adjacent blades of the drive blade and the plurality of side blades, wherein each of the plurality of spacers are coupled to one of the at least two rivets.

2. The reciprocating saw blade assembly of claim 1, wherein the cutting edges of the drive blade and the plurality of side blades are aligned along a common plane.

3. The reciprocating saw blade assembly of claim 1, wherein first ends and second ends of the plurality of side blades are aligned and the drive blade overlaps with a majority of the adjacent side blades of the plurality of sides blades.

4. A reciprocating saw blade assembly, comprising:
   a drive blade comprising a tang on a first end of the drive blade configured to removably couple to a powered reciprocating saw tool, and a second end opposite the first end;
   a plurality of side blades positionally coupled to the drive blade and each comprising a first end proximate and offset from the first end of the drive blade such that the tang of the drive blade is exposed and protrudes longitudinally away from the plurality of side blades, a second end opposite the first end, and a cutting edge comprising a plurality of teeth and extending at least partially between the first end of the respective plurality of side blades and the second end of the respective plurality of side blades, wherein at least one of the plurality of side blades is positionally coupled to a first side of the drive blade and at least one of the plurality of side blades is positionally coupled to a second side of the drive blade opposite the first side of the drive blade, and wherein the drive blade is coupled to the plurality of side blades with at least two rivets, each of the at least two rivets extending through the drive blade and the plurality of side blades; and
   a plurality of spacers positioned between each pair of adjacent blades of the drive blade and the plurality of side blades, wherein each of the plurality of spacers are coupled to one of the at least two rivets.

5. The reciprocating saw blade assembly of claim 4, wherein first ends and second ends of the plurality of side blades are aligned and the drive blade overlaps with a majority of the adjacent side blades of the plurality of sides blades.

* * * * *